US012283695B2

(12) United States Patent
Matsumoto et al.

(10) Patent No.: US 12,283,695 B2
(45) Date of Patent: Apr. 22, 2025

(54) NEGATIVE ELECTRODE MATERIAL FOR LITHIUM ION SECONDARY BATTERY, METHOD OF MANUFACTURING NEGATIVE ELECTRODE MATERIAL FOR LITHIUM ION SECONDARY BATTERY, NEGATIVE ELECTRODE MATERIAL SLURRY FOR LITHIUM ION SECONDARY BATTERY, NEGATIVE ELECTRODE FOR LITHIUM ION SECONDARY BATTERY, AND LITHIUM ION SECONDARY BATTERY

(71) Applicant: Showa Denko Materials Co., Ltd., Tokyo (JP)

(72) Inventors: Yoshiyuki Matsumoto, Tokyo (JP); Takeshi Masayoshi, Tokyo (JP); Takashi Sakamoto, Tokyo (JP); Hideyuki Tsuchiya, Tokyo (JP)

(73) Assignee: RESONAC CORPORATION, Tokyo (JP)

( * ) Notice: Subject to any disclaimer, the term of this patent is extended or adjusted under 35 U.S.C. 154(b) by 509 days.

(21) Appl. No.: 17/639,515

(22) PCT Filed: Sep. 2, 2019

(86) PCT No.: PCT/JP2019/034414
§ 371 (c)(1),
(2) Date: Mar. 1, 2022

(87) PCT Pub. No.: WO2021/044482
PCT Pub. Date: Mar. 11, 2021

(65) Prior Publication Data
US 2022/0293942 A1 Sep. 15, 2022

(51) Int. Cl.
*H01M 4/583* (2010.01)
*H01M 4/02* (2006.01)
(Continued)

(52) U.S. Cl.
CPC ........ *H01M 4/583* (2013.01); *H01M 4/0404* (2013.01); *H01M 4/0471* (2013.01);
(Continued)

(58) Field of Classification Search
CPC .. H01M 4/583; H01M 4/0404; H01M 4/0471; H01M 10/0525; H01M 2004/021;
(Continued)

(56) References Cited

U.S. PATENT DOCUMENTS 6,344,296 B1    2/2002   Ishii
10,122,018 B2   11/2018   Tsuchiya et al.
(Continued)

FOREIGN PATENT DOCUMENTS

JP    H10-158005 A    6/1998
JP    2006-59690 A     3/2006
(Continued)

*Primary Examiner* — Daniel S Gatewood
(74) *Attorney, Agent, or Firm* — FITCH, EVEN, TABIN & FLANNERY, LLP

(57) ABSTRACT

A negative electrode material for a lithium ion secondary battery, including composite particles, each of the composite particles including: a spherical graphite particle; and flat graphite particles that are gathered or bound together such that the flat graphite particles have non-parallel orientation planes, wherein the composite particles satisfy the following (1) and (2): (1) a pore volume in a range of a pore diameter of from 0.10 to 8.00 μm obtained by the mercury intrusion method is from 0.20 to 1.00 mL/g; and (2) in a log differential pore volume distribution obtained by the mercury intrusion method, at least two peaks appear in a range of a pore diameter of from 0.10 to 8.00 the two peaks including a first peak P1 and a second peak P2 at a higher diameter than the first peak P1.

12 Claims, 5 Drawing Sheets

(51) Int. Cl.
*H01M 4/04* (2006.01)
*H01M 10/0525* (2010.01)

(52) U.S. Cl.
CPC .. *H01M 10/0525* (2013.01); *H01M 2004/021* (2013.01); *H01M 2004/027* (2013.01)

(58) Field of Classification Search
CPC ........... H01M 2004/027; H01M 4/364; H01M 4/133; H01M 4/587; Y02E 60/10
See application file for complete search history.

(56) References Cited

U.S. PATENT DOCUMENTS

| | | |
|---|---|---|
| 2001/0033822 A1 | 10/2001 | Ishii |
| 2002/0006376 A1 | 1/2002 | Ishii |
| 2003/0022064 A1 | 1/2003 | Ishii |
| 2006/0001003 A1 | 1/2006 | Ishii |
| 2006/0093546 A1 | 5/2006 | Ishii |
| 2006/0099509 A1 | 5/2006 | Ishii |
| 2006/0159996 A1 | 7/2006 | Ishii |
| 2007/0117016 A1 | 5/2007 | Ishii |
| 2008/0274404 A1 | 11/2008 | Ishii |
| 2010/0159323 A1 | 6/2010 | Ishii |
| 2011/0189542 A1 | 8/2011 | Ishii |
| 2012/0189905 A1 | 7/2012 | Ishii |
| 2014/0057159 A1 | 2/2014 | Ishii |
| 2014/0349173 A1 | 11/2014 | Ishii |

FOREIGN PATENT DOCUMENTS

| | | | | |
|---|---|---|---|---|
| JP | 2006059690 A | * | 3/2006 | |
| JP | 2017-062991 A | | 3/2017 | |
| JP | 6160770 B2 | | 7/2017 | |
| WO | WO-2015147012 A1 | * | 10/2015 | ............. C01B 32/20 |
| WO | 2019/026265 A1 | | 2/2019 | |

* cited by examiner

NEGATIVE ELECTRODE MATERIAL FOR LITHIUM ION SECONDARY BATTERY, METHOD OF MANUFACTURING NEGATIVE ELECTRODE MATERIAL FOR LITHIUM ION SECONDARY BATTERY, NEGATIVE ELECTRODE MATERIAL SLURRY FOR LITHIUM ION SECONDARY BATTERY, NEGATIVE ELECTRODE FOR LITHIUM ION SECONDARY BATTERY, AND LITHIUM ION SECONDARY BATTERY

CROSS-REFERENCE TO RELATED APPLICATION

This application is a U.S. national phase application filed under 35 U.S.C. § 371 of International Application No. PCT/JP2019/034414 filed Sep. 2, 2019, designating the United States.

TECHNICAL FIELD

The present disclosure relates to a negative electrode material for a lithium ion secondary battery, a method of manufacturing a negative electrode material for a lithium ion secondary battery, a negative electrode material slurry for a lithium ion secondary battery, a negative electrode for a lithium ion secondary battery, and a lithium ion secondary battery.

BACKGROUND ART

Lithium ion secondary batteries have a higher energy density compared to other secondary batteries such as nickel-cadmium batteries, nickel-hydrogen batteries, and lead storage batteries. Therefore, lithium ion secondary batteries are used as power sources for portable electric appliances such as laptop computers and mobile phones.

Recent trends in the development of lithium ion secondary batteries include reducing the cost and reducing the size of the batteries to save the resources, as well as expanding their applications to electric vehicles, power sources for electricity storage and so forth. Therefore, there is a demand for higher capacity, higher input and output, and cost reduction by increasing the density of negative electrodes. As materials to obtain a high-density negative electrode, carbon materials having a high degree of crystallinity, such as artificial graphite, and spherical natural graphite particles obtained by spheroidizing natural vein graphite are attracting attention.

As for the artificial graphite, Japanese Patent Application Laid-Open (JP-A) No. H10-158005 suggests improving cycling performance and rapid charge-discharge characteristics by using, as a negative electrode active material, graphite particles having a secondary particle structure in which flat primary particles are gathered or bound together such that the flat graphite particles have non-parallel orientation planes.

SUMMARY OF INVENTION

Technical Problem

As described above, energy density of lithium ion secondary batteries per volume can be increased by increasing the density of the negative electrode. However, in the case of a negative electrode material that employs artificial graphite particles having a secondary particle structure, a negative electrode is manufactured by applying the negative electrode material to a current collector and pressing the negative electrode material at a high pressure for densification. This process involves a problem that the spaces between the particles are reduced by the particles being crushed, thereby deteriorating the permeation of electrolytic solution.

In view of the foregoing circumstances, the present disclosure is directed to providing a negative electrode material for a lithium ion secondary battery that allows for obtaining a lithium ion secondary battery having an excellent liquid permeation property even after a densification process of the electrode; a manufacturing process thereof; and a negative electrode material slurry for a lithium ion secondary battery, a negative electrode for a lithium ion secondary battery, and a lithium ion secondary battery that employs the negative electrode material for a lithium ion secondary battery.

Solution to Problem

After diligent studies, the inventors found that the foregoing problem can be solved by using a negative electrode material for a lithium ion secondary battery, the negative electrode material including composite particles, each of the composite particles including a spherical graphite particle and flat graphite particles that are gathered or bound together such that the flat graphite particles have non-parallel orientation planes, in which the composite particles satisfy the following conditions (1) and (2):

(1) the pore volume in a range of a pore diameter of from 0.10 to 8.00 µm obtained by a mercury intrusion method is from 0.20 to 1.00 mL/g; and (2) in a log differential pore volume distribution obtained by the mercury intrusion method, at least two peaks appear in a range of a pore diameter of from 0.10 to 8.00 µm, the at least two peaks including a first peak P1 and a second peak P2 at a higher diameter than the first peak P1.

Specific means for solving the foregoing problem include the following aspects.

[1] A negative electrode material for a lithium ion secondary battery, the negative electrode material including composite particles, each of the composite particles including: a spherical graphite particle; and flat graphite particles that are gathered or bound together such that the flat graphite particles have non-parallel orientation planes, wherein the composite particles satisfy the following conditions (1) and (2):

(1) a pore volume in a range of a pore diameter of from 0.10 to 8.00 µm obtained by a mercury intrusion method is from 0.20 to 1.00 mL/g; and (2) in a log differential pore volume distribution obtained by the mercury intrusion method, at least two peaks appear in a range of a pore diameter of from 0.10 to 8.00 µm, the at least two peaks including a first peak P1 and a second peak P2 at a higher diameter than the first peak P1.

[2] The negative electrode material for a lithium ion secondary battery according to [1], wherein:

a pore diameter corresponding to a maximum log differential pore volume of the first peak P1 is from 0.10 to less than 4.00 µm, and a pore diameter corresponding to a maximum log differential pore volume of the second peak P2 is from 4.00 to 8.00 µm.

[3] The negative electrode material for a lithium ion secondary battery according to [1] or [2], wherein a ratio of peak intensities of the first peak and the second peak (P1/P2) is less than 4.0.

[4] The negative electrode material for a lithium ion secondary battery according to any one of [1] to [3], wherein an R-value of the composite particles as measured by Raman spectroscopy is from 0.03 to 0.10.

[5] The negative electrode material for a lithium ion secondary battery according to any one of [1] to [4], wherein the specific surface area of the composite particles as measured by the BET method is from 1.5 to 6.0 m$^2$/g.

[6] The negative electrode material for a lithium ion secondary battery according to any one of [1] to [5], wherein a saturated tap density of the composite particles is from 0.60 to 0.90 g/cm$^3$.

[7] The negative electrode material for a lithium ion secondary battery according to any one of [1] to [6], wherein the spherical graphite particles have a circularity of 0.80 or higher.

[8] The negative electrode material for a lithium ion secondary battery according to any one of [1] to [7], further including non-composite spherical natural graphite particles, wherein a content of the spherical natural graphite particles with respect to a total amount of the composite particles and the non-composite spherical natural graphite particles is 30% by mass or more.

[9] A method of manufacturing the negative electrode material for a lithium ion secondary battery according to any one of [1] to [8], the method including preparing the composite particles by a method including:
obtaining a mixture including a graphitizable aggregate, a graphitizable binder, a graphitization catalyst, and a spherical graphite particle; and
calcining the mixture.

[10] The method of manufacturing the negative electrode material for a lithium ion secondary battery according to [9], wherein the method of preparing the composite particles further includes, between obtaining the mixture and calcining the mixture, at least one selected from the group consisting of molding the mixture and heat-treating the mixture.

[11] A negative electrode material slurry for a lithium ion secondary battery, the slurry including:
the negative electrode material for a lithium ion secondary battery according to any one of [1] to [8], or a negative electrode material for a lithium ion secondary battery manufactured by the method of manufacturing a negative electrode material for a lithium ion secondary battery according to [9] or [10];
an organic binder; and
a solvent.

[12] A negative electrode for a lithium ion secondary battery, the negative electrode including:
a current collector; and
a negative electrode material layer including the negative electrode material for a lithium ion secondary battery according to any one of [1] to [8] or a negative electrode material for a lithium ion secondary battery manufactured by the method of manufacturing a negative electrode material for a lithium ion secondary battery according to [9] or [10], that is formed on the current collector.

[13] A lithium ion secondary battery, including:
a positive electrode;
an electrolyte; and
the negative electrode for a lithium ion secondary battery according to [12].

Advantageous Effects of Invention

According to the present disclosure, a negative electrode material for a lithium ion secondary battery that allows for obtaining a lithium ion secondary battery having an excellent liquid permeation property even after a densification process of the electrode; a manufacturing process thereof; and a negative electrode material slurry for a lithium ion secondary battery, a negative electrode for a lithium ion secondary battery, and a lithium ion secondary battery that employs the negative electrode material for a lithium ion secondary battery, are provided.

DESCRIPTION OF EMBODIMENTS

Figure 1A:
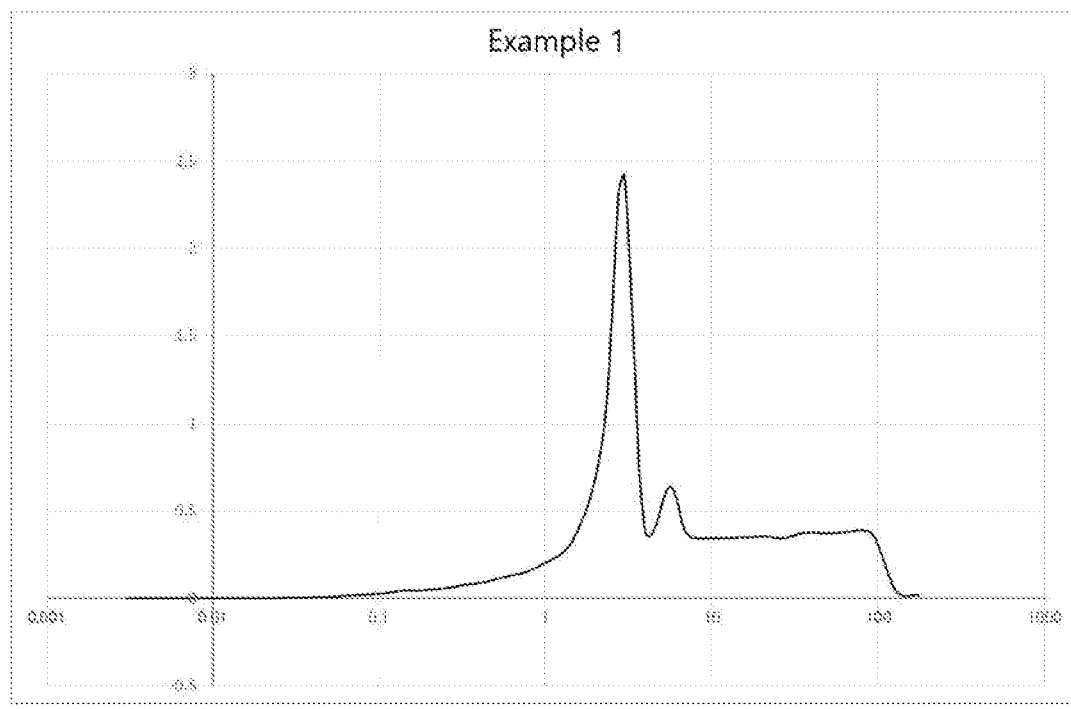
FIG. 1A shows a log differential pore volume distribution of the composite particles produced in Example 1, obtained by the mercury intrusion method.
Figure 1B:
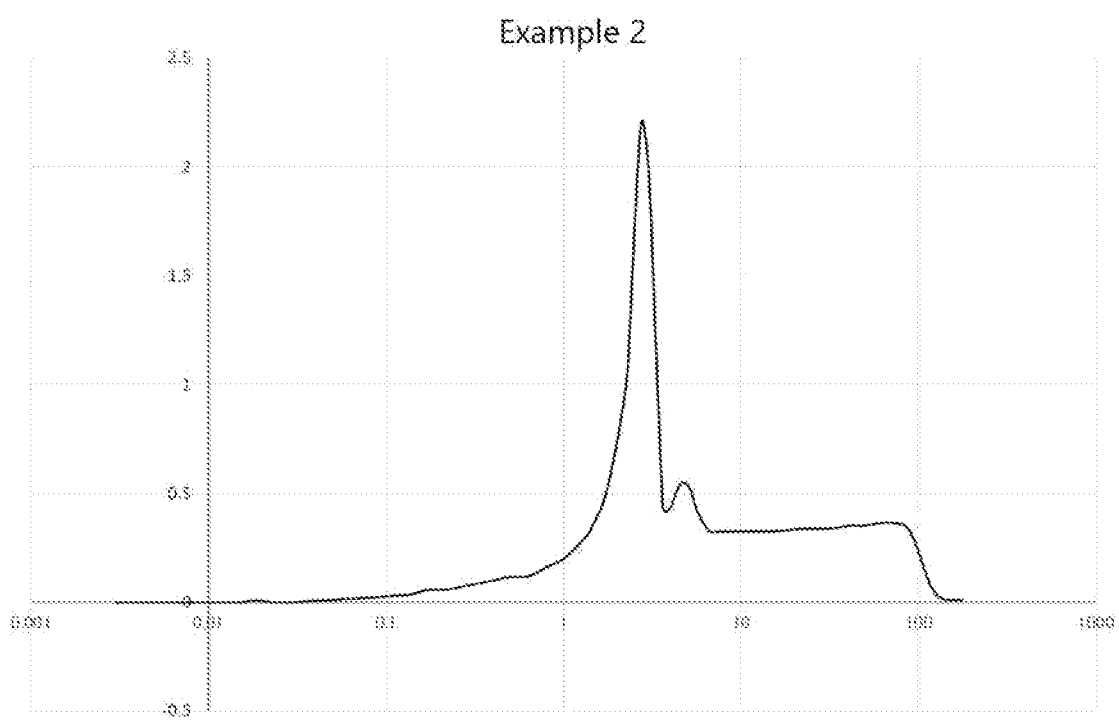
FIG. 1B shows a log differential pore volume distribution of the composite particles produced in Example 2, obtained by the mercury intrusion method.
Figure 1C:
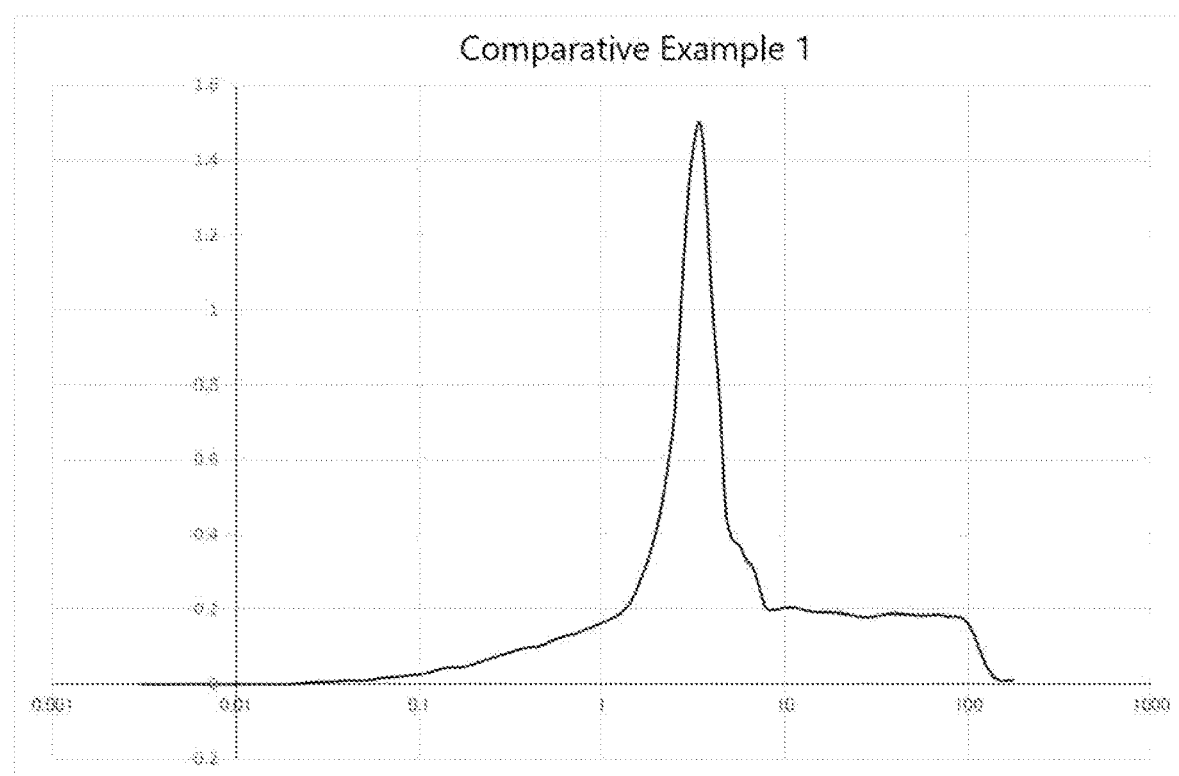
FIG. 1C shows a log differential pore volume distribution of the composite particles produced in Comparative Example 1, obtained by the mercury intrusion method.
Figure 1D:
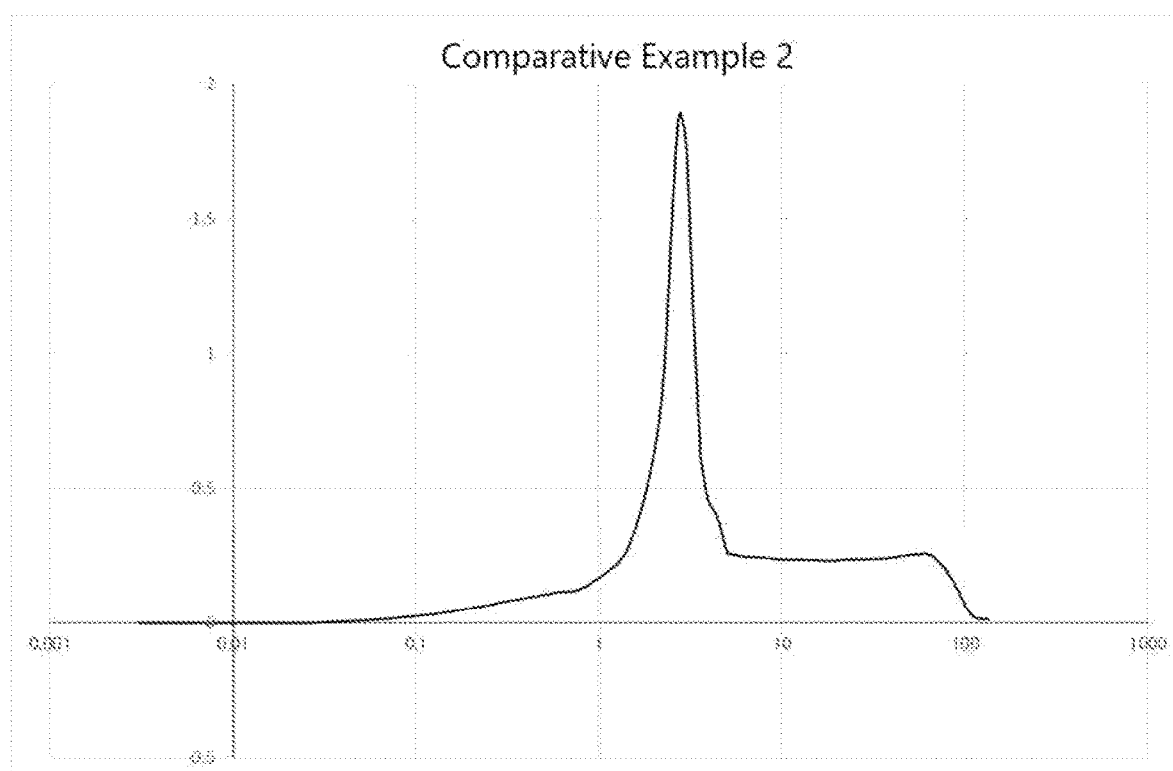
FIG. 1D shows a log differential pore volume distribution of the composite particles produced in Comparative Example 2, obtained by the mercury intrusion method.

Embodiments for carrying out the invention will be described below in detail. However, the invention is not limited to the following embodiments. In the following embodiments, components (including elemental steps, etc.) thereof are not essential unless otherwise specified. The same applies to numerical values and ranges, which do not limit the invention.

In the present disclosure, the term "step" encompasses an independent step separated from other steps as well as a step that is not clearly separated from other steps, as long as the purpose of the step can be achieved.

In the present disclosure, a numerical range specified using "(from) . . . to . . . " represents a range including the numerical values noted before and after "to" as a minimum value and a maximum value, respectively.

In the numerical ranges described in a stepwise manner in the present disclosure, the upper limit value or the lower limit value described in one numerical range may be replaced with the upper limit value or the lower limit value of another numerical range described in a stepwise manner. Further, in the numerical ranges described in the present disclosure, the upper limit value or the lower limit value of the numerical ranges may be replaced with the values shown in the Examples.

In the present disclosure, each component may include plural substances corresponding to the component. In the case in which plural substances corresponding to a component are present in a composition, an amount or content of the component in the composition means the total amount or content of the plural substances present in the composition, unless otherwise specified.

In the present disclosure, each component may include plural kinds of particles corresponding to the component. In the case in which plural kinds of particles corresponding to a component are present in a composition, a particle size of the component means a value with respect to the mixture of the plural kinds of particles present in the composition, unless otherwise specified.

The term "layer" as used herein encompasses, when a region in which the layer is present is observed, not only a case in which the layer is formed over the entire observed region, but also a case in which the layer is formed at only a part of the observed region.

The term "layered" as used herein means disposing layers on one another, in which two or more layers may be bonded with each other, or may be attachable to/detachable from one another.

In the present disclosure, the term "(meth)acrylic" means at least one selected from the group consisting of acrylic and methacrylic, the term "(meth)acrylate" means at least one selected from the group consisting of acrylate or methacrylate, and the term "(meth)acrylonitrile" means at least one selected from the group consisting of acrylonitrile or methacrylonitrile.

In the present disclosure, descriptions regarding the pore volume distribution (including the pore volume) and the particle size distribution (including the average particle size) of the specific composite particles described later contained in the negative electrode material are intended to mean a pore volume distribution and particle size distribution with regard to the entire specific composite particles contained in the negative electrode material, the entire specific composite particles being regarded as a set.

[Negative Electrode Material for a Lithium Ion Secondary Battery]

The negative electrode material for a lithium ion secondary battery according to the present disclosure includes composite particles, each of the composite particles including: a spherical graphite particle; and flat graphite particles that are gathered or bound together such that the flat graphite particles have non-parallel orientation planes, in which the composite particles satisfy the following conditions (1) and (2).

(1) The pore volume in a range of a pore diameter of from 0.10 to 8.00 μm obtained by the mercury intrusion method is from 0.20 to 1.00 mL/g.

(2) In a log differential pore volume distribution obtained by the mercury intrusion method, at least two peaks appear in a range of a pore diameter of from 0.10 to 8.00 μm, the at least two peaks including a first peak P1 and a second peak P2 at a higher diameter than the first peak P1.

Hereinafter, the composite particle that includes a spherical graphite particle and flat graphite particles that are gathered or bound together such that the flat graphite particles have non-parallel orientation planes is referred to as a "specific composite particle".

It has been found that, by using the negative electrode material for a lithium ion secondary battery according to the present disclosure, a lithium ion secondary battery having an excellent liquid permeation property can be obtained even after a densification process of the electrode. Although the reason for this is not entirely clear, the reason for this can be surmised as follows.

In specific composite particles contained in the negative electrode material for a lithium ion secondary battery according to the present disclosure, the pore volume in a range of a pore diameter of from 0.10 to 8.00 μm obtained by the mercury intrusion method is from 0.20 to 1.00 mL/g. It is presumed that, by the pore volume of the specific composite particles being in the above range, an appropriate amount of electrolytic solution tends to move into the pores of the negative electrode.

Further, in the specific composite particles contained in the negative electrode material for a lithium ion secondary battery according to the present disclosure, in a log differential pore volume distribution obtained by the mercury intrusion method, at least two peaks appear in a range of a pore diameter of from 0.10 to 8.00 μm. It is presumed that such specific composite particles maintain a certain amount of pores having relatively large diameters, allowing the electrolytic solution to permeate therein easily. Further, it is presumed that, since such specific composite particles tend to maintain pores having relatively large diameters even after a densification process of the negative electrode at the time of fabricating the negative electrode, the electrolytic solution tends to move smoothly, and the liquid permeation property improves.

[Specific Composite Particles]

The specific composite particle is not particularly limited as long as it is a composite particle that includes a spherical graphite particle and flat graphite particles that are gathered or bound together such that the flat graphite particles have non-parallel orientation planes. For example, the flat graphite particles may be gathered or bound together such that the graphite particles have non-parallel orientation planes, and bound to at least a part of the surface of the spherical graphite particle. More specifically, the flat graphite particles may be bound to at least a part of the surface of the spherical graphite particle via a carbon material derived from a binder. Whether or not a specific composite particle has been formed can be confirmed by, for example, observation with a scanning electron microscope (SEM).

—Flat Graphite Particles—

The specific composite particle includes flat graphite particles that are gathered or bound together such that the flat graphite particles have non-parallel orientation planes.

The flat graphite particles have a non-spherical shape having a major axis and a minor axis. Examples thereof include vein graphite particles, flake graphite particles, or partially lump graphite particles. More specifically, the aspect ratio represented by A/B, A representing the length in the major axis direction and B representing the length in the minor axis direction, may be from 1.2 to 5.0, or from 1.3 to 3.0. The aspect ratio is a value obtained by enlarging the image of the graphite particles with a microscope, measuring A/B of 100 randomly selected graphite particles, and taking the average value thereof.

The expression that "the flat graphite particles have non-parallel orientation planes" means that a plane that is parallel to the plane having the largest cross-sectional area (orientation plane) of each of at least two flat graphite particles is not parallel to each other. Whether or not the orientation planes of the flat graphite particles are not parallel to each other can be confirmed by observation of a microscopic image. By the flat graphite particles being gathered or bound together such that the flat graphite particles have non-parallel orientation planes, increase in the degree of orientation of the particles on the electrode can be suppressed, and an effect of achieving a high charge-discharge capacity can be obtained.

The state in which the flat graphite particles are gathered or bound together may be a state in which two or more flat graphite particles are chemically gathered or bound together via a carbon material. The carbon material may be a carbon material that results from carbonization of a binder such as tar or pitch during a calcination process. From the viewpoint of physical strength, the flat graphite particles may be bound together. Whether or not the graphite particles are gathered or bound together can be confirmed by, for example, observation by a scanning electron microscope.

The number of the flat graphite particles that are gathered or bound together may be 3 or more, or may be 10 or more. Further, the number of the flat graphite particles that are gathered or bound together may be one or less.

Regarding the size the individual flat graphite particles, the flat graphite particles may have an average particle size (D50) of 50 μm or less, or 25 μm or less, from the viewpoint of ease of the gathering or the binding. The average particle size (D50) may be 1 μm or more. The average particle size (D50) of the graphite particles can be measured in a similar manner to the measurement of the average particle size of the negative electrode material described later.

The raw material of the flat graphite particles is not particularly limited, and examples thereof include artificial graphite, natural graphite, coke, resin, tar, and pitch. In particular, graphite particles obtained from artificial graphite, natural graphite, or coke form soft particles having a high crystallinity, allowing easy densification of an electrode at the time of fabricating the electrode. Further, in a case in which graphite having a high crystallinity is used, the R-value of the specific composite particles measured by Raman spectroscopy tends to be lowered, whereby initial charge-discharge efficiency tends to be improved.

—Spherical Graphite Particle—

The specific composite particle includes a spherical graphite particle. By including a spherical graphite particle, which has a high density, the density of the negative electrode material can be increased as compared to a case in which only the flat graphite particles are included, and the pressure to be applied during the densification treatment tends to be able to be reduced. As a result, a phenomenon in which the flat graphite particles are oriented in a direction parallel to the current collector to prevent the movement of lithium ions may be suppressed.

Examples of spherical graphite particles and a raw material thereof include spherical artificial graphite particles and spherical natural graphite particles. From the viewpoint of achieving a sufficient saturated tap density of a negative electrode material, the spherical graphite particles may be graphite particles having a high density. Specifically, the spherical graphite particles may be spherical natural graphite particles that have undergone a spheroidizing treatment to increase the tap density, or may be spherical graphite particles that have been calcined at 1500° C. or higher. Calcination of the spherical graphite particles used as a raw material at 1500° C. or higher results in spherical graphite particles having a high crystallinity, whereby the R-value of the specific composite particles can be lowered.

The average particle size of the spherical graphite particles is not particularly limited, and may be from 5 to 40 μm, from 8 to 35 μm, or from 10 to 30 μm. The average particle size can be measured by a laser diffraction particle size distribution analyzer, and means a particle size at which the cumulative volume from the small diameter side of a volume-based particle size distribution reaches 50% (D50). Specifically, the measurement can be carried out in a similar manner to the measurement of the average particle size of the negative electrode material described later.

The circularity of the spherical graphite particles is not particularly limited, and may be 0.80 or higher, or 0.85 or higher. Some spherical graphite particles are deformed by a mechanical force during the manufacture of the specific composite particles. However, when the overall circularity of the spherical graphite particles contained in the specific composite particles is high, the degree of orientation of the negative electrode material is reduced, and the electrode performance can be improved. Examples of the method for increasing the circularity of the spherical graphite particles include using spherical graphite particles having a high circularity as a raw material. The circularity is measured in terms of the portion of the spherical graphite particles included in the specific composite particles.

The degree of circularity of the spherical graphite particles can be determined according to the following equation by photographing a cross-section of the spherical graphite particles.

Circularity=(perimeter of an equivalent circle)/(perimeter of a cross-sectional image of a spherical graphite particle)

The "equivalent circle" is a circle having the same area as a cross-sectional image of the spherical graphite particle. The perimeter of the cross-sectional image of the spherical graphite particle is the length of the outline of the cross-sectional image of the photographed spherical graphite particle. The circularity in the present disclosure represents a value obtained by observing the cross-sectional image of the spherical graphite particles enlarged 1000-fold using a scanning electron microscope, measuring the individual circularity of 10 randomly selected spherical graphite particles by the foregoing method, and taking the average thereof.

In the case of a negative electrode using the negative electrode material for a lithium ion secondary battery that includes the specific composite particles, examples of the method for measuring the circularity of the spherical graphite particles include: a method in which a sample electrode or an electrode to be observed is embedded in an epoxy resin, which is then subjected to mirror polishing, followed by observation of the cross-section of the electrode using a scanning microscope; and a method in which a cross-section of an electrode prepared using an ion milling apparatus (e.g., E-3500, manufactured by Hitachi High-Technologies Corporation) is observed using a scanning electron microscope.

The sample electrode can be prepared, for example, in the same manner as the sample electrode used for measuring the average particle size described below.

[Average Particle Size (Median Diameter) of Specific Composite Particles]

The average particle size (median diameter) of the specific composite particles is not particularly limited. From the viewpoints of an impact on the degree of orientation and permeability of electrolytic solution, the average particle size of the specific composite particles may be from 10 to 30 μm, or from 15 to 25 μm. The average particle size can be measured using a laser diffraction particle size distribution analyzer, and means a particle size at which the cumulative volume from the small diameter side of a volume-based particle size distribution reaches 50% (D50).

The average particle size can be measured using a laser diffraction particle size distribution analyzer (e.g., SALD-3000J, manufactured by Shimadzu Corporation) under the following conditions.

Absorbance: 0.05 to 0.20

Sonication: 0.5 to 3 minutes

In the case of a negative electrode using the negative electrode material for a lithium ion secondary battery that includes the specific composite particles, examples of the method for measuring the average particle size of the specific composite particles include: a method in which a sample electrode or an electrode to be observed is embedded in an epoxy resin, which is then subjected to mirror polishing, followed by observation of the cross-section of the electrode using a scanning microscope; and a method in which a cross-section of an electrode prepared using an ion milling apparatus (e.g., E-3500, manufactured by Hitachi High-Technologies Corporation) is observed using a scanning electron microscope. The average particle size in this case is a median value of the particle sizes of 100 randomly selected specific composite particles.

The sample electrode may be prepared by, for example, adding water to a solid content, which is a mixture of 98 parts by mass of a negative electrode material for a lithium ion secondary battery, 1 part by mass of a styrene-butadiene resin as a binder, and 1 part by mass of carboxymethyl cellulose as a thickener, such that the mixture has a viscosity of from 1500 to 2500 mPa·s at 25° C., to prepare a dispersion, coating a copper foil having a thickness of 10 μm with the dispersion such that the thickness thereof reaches about 70 μm (at the time of application), and drying the resultant at 120° C. for 1 hour.

[R-Value of Specific Composite Particles Measured by Raman Spectroscopy]

The R-value of the specific composite particles measured by Raman spectroscopy is preferably from 0.03 to 0.10. The R-value may be from 0.04 to 0.10, or from 0.05 to 0.10. The R-value of 0.10 or less tends to suppress a decomposition reaction of electrolytic solution, thereby suppressing the occurrence of gaseous swelling and deterioration in initial efficiency of the lithium ion secondary battery. As a result, it is presumed that the specific composite particles can be suitably applied to an electrode having a high density. The R-value of 0.03 or more tends to maintain sufficient graphite lattice defects for intercalation and deintercalation of lithium ions, thereby maintaining favorable charge-discharge load characteristics.

The R-value is defined as an intensity ratio (IB/IA) of a maximum peak intensity D3 near 1360 cm$^{-1}$ to a maximum peak intensity IA near 1580 cm$^{-1}$ in a Raman spectrum obtained by Raman spectroscopy described below.

The Raman spectroscopy can be performed using, for example, a Raman spectrometer "Laser Raman Spectrometer" (model number: NRS-1000, manufactured by JASCO Corporation), by evenly placing, on a sample plate, the specific composite particles or an electrode obtained by applying the specific composite particles to a current collector and pressing the particles, and irradiating the negative electrode material for a lithium ion secondary battery with semiconductor laser light. The conditions for the measurement are as follows.

Wavelength of the semiconductor laser light: 532 nm

Wavenumber resolution: 2.56 cm$^{-1}$

Measurement range: 1180 to 1730 cm$^{-1}$

Peak research: background removal

Examples of the method for obtaining the specific composite particles that have an R-value measured by Raman spectroscopy of from 0.03 to 0.10 include a method of calcining the spherical graphite particles as described above. The examples further include a method of adjusting the percentage of the carbon residue that results from a binder component such as pitch used as a raw material to 30% by mass or less with respect to the total mass of the specific composite particles.

Components having a low crystallinity, such as a binder component and the like, are used to gather or bind the flat graphite particles to form the composite particles. However, development in crystallinity by graphitization does not occur easily, and the residual carbon content is low. Therefore, by adjusting the ratio of the residual carbon content that results from the binder component to 30% by mass or less with respect to the total amount of the specific composite particles, favorable productivity tends to be maintained. Further, while a large amount of a binder component tends to result in hard graphitized particles, by adjusting the ratio of the residual carbon that results from the binder component to 30% by mass or lower with respect to the total mass of the specific composite particles, increase in the R-value tends to be suppressed, the increase in the R-value being caused by the occurrence of lattice defects owing to the load applied to the surface of the graphite particles at the time of pulverization for adjusting the particle size or at the time of pressing for adjusting the density of the electrode.

[Pore Volume of Specific Composite Particles]

The specific composite particles included in the negative electrode material for a lithium ion secondary battery according to the present disclosure has a pore volume of from 0.20 to 1.00 mL/g in a range of a pore diameter of from 0.10 to 8.00 μm, the pore volume being obtained by the mercury intrusion method. Here, the pore volume refers to a cumulative pore volume in the range of a pore diameter of from 0.10 to 8.00 μm.

When the specific composite particles have a pore volume of 0.20 mL/g or more, the permeation speed of the electrolytic solution of the lithium ion secondary battery, which is a moving medium for lithium ions, tends to be high, whereby favorable rapid charge-discharge characteristics tends to be obtained. Further, when the pore volume is 1.00 mL/g or less, oil-absorbing capacity of additives, such as an organic binder and a thickener, tends to be suppressed, whereby viscosity of the negative electrode material slurry can be easily controlled, and adhesion to the current controller tends to be favorably maintained.

The specific composite particles may have a pore volume of from 0.40 to 0.80 mL/g, or from 0.50 mL/g to 0.80 mL/g, in a range of a pore diameter of from 0.10 to 8.00 μm, the pore volume being obtained by the mercury intrusion method. From the viewpoint of adjusting the amount of the electrolytic solution that moves inside of the negative electrode in a more favorable manner, the pore volume is preferably from 0.50 to 1.00 mL/g, and more preferably from 0.60 to 1.00 mL/g. The pore volume of the specific composite particles can be adjusted to the foregoing ranges by, for example, appropriately adjusting the blending ratio of the spherical graphite particles.

The mercury intrusion method is curried out using, for example, a porosimeter Autopore 9520, manufactured by Shimadzu Corporation. The mercury parameters are set such that the mercury contact angle is 130.0°, and the mercury surface tension is 485.0 mN/m (485.0 dynes/cm). A sample (about 0.3 g) is placed in a standard cell, and measured under a condition of an initial pressure of 9 kPa (about 1.3 psia, equivalent to a pore diameter of about 140 μm). From the obtained pore distribution, the volume of the pore volume in the range of from 0.10 to 8.00 μm is calculated.

In a log differential pore volume distribution of the specific composite particles, obtained by the mercury intrusion method, at least two peaks appear in a range of a pore diameter of from 0.10 to 8.00 µm, the at least two peaks including a first peak P1 and a second peak P2 at a higher diameter than the first peak P1. It was found that, when the at least two peaks appear in the log differential pore volume distribution, excellent liquid permeation property of the negative electrode can be obtained.

The first peak P1 and the second peak P2 are determined as follows. Largest two peaks in the foregoing pore diameter range are selected, of which the peak at a lower diameter (i.e., the peak that appears at a smaller diameter) is defined to be the first peak P1, and the peak at a higher diameter (i.e., the peak that appears at a larger diameter) is defined to be the second peak P2.

In the negative electrode material for a lithium secondary battery according to the present disclosure, three or more peaks may appear in the foregoing pore diameter range, and it is preferable that only two peaks appear in the foregoing pore diameter range.

In a preferable embodiment, the pore diameter corresponding to the maximum log differential pore volume of the first peak P1 is from 0.10 to less than 4.00 µm, and the pore diameter corresponding to the maximum log differential pore volume of the second peak P2 is from 4.00 to 8.00 µm.

In a more preferable embodiment, the pore diameter corresponding to the maximum log differential pore volume of the first peak P1 is from 1.00 µm to less than 4.00 µm, and the pore diameter corresponding to the maximum log differential pore volume of the second peak P2 is from 4.00 to 7.00 µm.

In a further preferable embodiment, the pore diameter corresponding to the maximum log differential pore volume of the first peak P1 is from 1.50 to less than 3.50 µm, and the pore diameter corresponding to the maximum log differential pore volume of the second peak P2 is from 4.50 to 6.50 µm.

The difference between the pore diameter corresponding to the maximum log differential pore volume of the first peak P1 and the pore diameter corresponding to the maximum log differential pore volume of the second peak P2 is not particularly limited. For example, the difference in the pore diameters may be from 0.50 to 5.00 µm, from 1.00 to 4.00 µm, or from 2.00 to 3.00 µm.

In the present disclosure, the fact that a log differential pore volume distribution of the specific composite particles has a peak is confirmed as follows. The presence of a peak is confirmed when the log differential pore volume distribution has a point at which the slope thereof changes from a positive value to a negative value, the log differential pore volume distribution being obtained by plotting the log differential pore volume (referred to as "y") against the pore diameter (referred to as "x") of the specific composite particles. However, a peak having a vertical height of less than 0.1 cm$^3$/g with respect to the background, that is, a line drawn by assuming that the peak does not exist, is not counted as a peak.

The ratio of the peak intensities of the first peak and the second peak (P1/P2) is not particularly limited, and is preferably less than 4.0, and may be 3.8 or less, from the viewpoint of further improving the liquid permeation property. From the viewpoint of increasing the surface area for intercalation and deintercalation of lithium ions, the ratio is preferably 0.5 or more, more preferably 1.0 or more, and further preferably 2.0 or more.

The ratio of the peak intensities can be calculated as a peak area ratio in a log differential pore volume distribution using the porosimeter described above.

The method for obtaining the specific composite particles in which, in a log differential pore volume distribution obtained by the mercury intrusion method, at least two peaks appear in a range of a pore diameter of from 0.10 to 8.00 µm, the at least two peaks including a first peak P1 and a second peak P2 at a higher diameter than the first peak P1, is not particularly limited.

For example, a negative electrode material having the at least two peaks may be obtained by controlling the composition of the raw materials for producing the specific composite particles to adjust the degree of graphitization. More specifically, for example, the specific composite particles having the at least two peaks tend to be readily obtained by reducing the blending amount of a graphitization catalyst to prevent excessive graphitization and to maintain the particles to be relatively hard.

Further, for example, the specific composite particles having the at least two peaks may be obtained by controlling the blending ratio of the spherical graphite particles that are a raw material of the specific composite particles, and controlling the degree of graphitization of other raw materials.

In addition, by not performing an isotropic pressing treatment, which will be described later, on the graphitized product obtained by calcination and pulverization, the pore size tends to be uneven, whereby the specific composite particles having the at least two peaks tend to be readily obtained.

[Specific Surface Area of Specific Composite Particles]

The specific composite particles may have a specific surface area measured by the BET method of from 1.5 to 6.0 m$^2$/g, or from 2.5 to 5.0 m$^2$/g. The specific surface area is an indicator representing the area of interface between the particles and the electrolytic solution. When the value of the specific surface area is 6.0 m$^2$/g or less, the interface between the specific composite particles and the electrolytic solution is not too large, whereby the increase in the reaction field of the decomposition reaction of the electrolytic solution may be suppressed, thereby suppressing gas generation, and further, favorable initial charge-discharge efficiency may be obtained. Further, when the value of the specific surface area is 1.5 m$^2$/g or more, since the current density per unit area does not rise rapidly, and the load is suppressed, favorable charge-discharge efficiency, charge acceptability, rapid charge-discharge characteristics and the like tend to be obtained.

The specific surface area can be measured by a known method, such as the BET method (nitrogen gas absorption method). Preferably, nitrogen gas is adsorbed, using a gas adsorption device (e.g., ASAP2010, manufactured by Shimadzu Corporation), to a sample obtained by: filling a measurement cell with the specific composite particles or placing in a measurement cell an electrode obtained by applying the specific composite particles to a current collector and pressing the particles; and carrying out heat pretreatment at 200° C. while vacuum-degassing. BET analysis is performed on the obtained sample by the 5-point method, and the specific surface area is calculated. The specific surface area of the specific composite particles can be adjusted within the foregoing ranges by, for example, controlling the average particle size. A smaller average particle size tends to result in a larger specific surface area, and a larger average particle size tends to result in a smaller specific surface area.

[Saturated Tap Density of Specific Composite Particles]

The specific composite particles preferably have a saturated tap density of from 0.60 to 0.90 g/cm$^3$, more preferably from 0.60 to 0.80 g/cm$^3$, and further preferably from 0.65 to 0.70 g/cm$^3$. The saturated tap density may be from 0.60 g/cm$^3$ to less than 0.80 g/cm$^3$, or from 0.60 g/cm$^3$ to less than 0.70 g/cm$^3$.

The saturated tap density is an indicator of densification of an electrode. When the specific composite particles have a saturated tap density of 0.60 g/cm$^3$ or more, an electrode, obtained by applying a negative electrode material for a lithium ion secondary battery including the specific composite particles to a current collector, tends to be densified, and therefore, the pressure applied for controlling the density of the electrode can be reduced, whereby the graphite particles in the electrode tend to be able to maintain their original shape. Maintaining the original shape of the graphite particles is advantageous in that, for example, the degree of orientation of the electrode plate is lower, that the intercalation and deintercalation of lithium ions are easier, and that the cycling performance is improved. When the specific composite particles have a saturated tap density of 0.90 g/cm$^3$ or lower, a sufficient pore volume tends to be maintained, whereby a sufficient amount of electrolytic solution, which is a moving medium for lithium ions, tends to be secured when a battery is fabricated, and favorable rapid charge-discharge characteristics tend to be obtained. The saturated tap density of the specific composite particles can be adjusted to the foregoing ranges by appropriately adjusting the content of the spherical graphite particles (a larger content of the spherical graphite particles tends to result in a larger tap density, and a lower content thereof tends to result in a smaller tap density).

The saturated tap density can be measured by a known method. The saturated tap density is preferably calculated, using a filling density measurement device (e.g., KRS-406, manufactured by Kuramochi Kagaku Kikai, Co., Ltd), by placing 100 mL of the specific composite particles in a graduated cylinder and tapping the graduated cylinder (dropping the graduated cylinder from a certain height) until the density is saturated.

[Pellet Density of Specific Composite Particles]

The pellet density of the specific composite particles is not particularly limited. For example, the specific composite particles preferably have a pellet density of 1.77 g/cm$^3$ or less. When the specific composite particles have a pellet density of 1.77 g/cm$^3$ or less, favorable pore volume and the at least two peaks tend to be obtained since the hardness of the specific composite particles is not too low. Further, decrease in the spaces between the particles caused by deformation of the specific composite particles at the time of applying pressure in the densification process of the electrode tends to be suppressed. This allows for maintaining the state in which the electrolytic solution easily permeates throughout the negative electrode material layer, thereby improving the liquid permeation property.

The pellet density of the specific composite particles can be obtained by measuring the volume density of a tablet obtained by placing 0.50 g of the specific composite particles in a tablet molding machine (base area of the tablet: 1.327 cm$^2$) and applying a pressure of 1 ton for 30 seconds.

—Mixed Negative Electrode Material—

The negative electrode material for a lithium ion secondary battery in the present disclosure may be mixed with a negative electrode material other than the specific composite particles (e.g., flat graphite particles that are not in a form of composite particles, spherical graphite particles that are not in a form of composite particles, vein graphite particles formed by multiple flat graphite particles gathered or bound together etc.) to be used for fabricating a negative electrode.

Hereinafter, a negative electrode material for a lithium ion secondary battery in which the specific composite particles and a negative electrode material other than the specific composite particles are mixed will also be referred to as a mixed negative electrode material. For example, the negative electrode material for a lithium ion secondary battery may be a mixture of the specific composite particles and at least one lithium ion-absorbing structure selected from the group consisting of natural graphite, artificial graphite, amorphous coated graphite, resin coated graphite, amorphous carbon, and absorbing metal particles.

In the case in which the negative electrode material for a lithium ion secondary battery in the present disclosure is a mixed negative electrode material, the content of the specific composite particles with respect to the entire negative electrode material for a lithium ion secondary battery may be 20% by mass or more, 30% by mass or more, 40% by mass or more, or 50% by mass or more. From the viewpoint of saving the cost for manufacturing a negative electrode material, the content of the specific composite particles with respect to the entire mixed negative electrode material may be 70% by mass or less, 60% by mass or less, or 50% by mass or less.

In particular, in the case in which the negative electrode material for a lithium ion secondary battery in the present disclosure is a mixed negative electrode material, the negative electrode material for a lithium ion secondary battery preferably contains non-composite spherical natural graphite particles in addition to the specific composite particles. The blending ratio thereof is not particularly limited. For example, the non-composite spherical natural graphite particles may be blended such that the content thereof with respect to the total amount of the specific composite particles and the non-composite spherical natural graphite particles is 30% by mass or more, 40% by mass or more, or 50% by mass or more. The content of the non-composite spherical natural graphite particles of 30% by mass or less is preferable from the viewpoint of being able to save the cost for manufacturing a negative electrode. From the viewpoint of obtaining favorable charge-discharge characteristics, the content of the non-composite spherical natural graphite particles with respect to the total amount of the specific composite particles and the non-composite spherical natural graphite particles may be 80% by mass or less.

It was found that the negative electrode material for a lithium ion secondary battery according to the present disclosure tends to exhibit a suitable pore volume distribution even in the case of a mixed negative electrode material obtained by mixing the specific composite particles and non-composite natural graphite particles. In particular, it was found that suitable pore volume distribution tends to be achieved even in a case in which a relatively large amount of non-composite spherical natural graphite particles is blended, for example, in a case in which the non-composite spherical natural graphite particles are blended at a content of 30% by mass or more with respect to the total amount of the specific composite particles and the non-composite spherical natural graphite particles.

In the case in which the negative electrode material for a lithium ion secondary battery is a mixed negative electrode material in which the specific composite particles and a negative electrode material other than the specific composite particles are mixed, the number of peak(s) that appear in the log differential pore volume distribution obtained by the mercury intrusion method may be one. The pore diameter corresponding to the maximum log differential pore volume is not particularly limited, and may be, for example, from 2.00 to 7.00 μm, or from 3.00 to 6.00 μm.

[Method for Manufacturing Negative Electrode Material for Lithium Ion Secondary Battery]

In an embodiment of the present disclosure, a method for manufacturing the negative electrode material for a lithium ion secondary battery includes preparing the composite particles by a method including: obtaining a mixture including a graphitizable aggregate, a graphitizable binder, a graphitization catalyst, and spherical graphite particles (referred to as process (a)); and calcining the mixture (referred to as process (b)).

The specific composite particles can be manufactured by the method including processes (a) and (b), and therefore, the negative electrode material for a lithium ion secondary battery according to the present disclosure described above can be manufactured. Further, according to the foregoing method, heavy metals, magnetic foreign substances and impurities contained in the raw materials are removed by high heat during the graphitization of the raw materials by calcination, and therefore, the spherical graphite particles such as natural graphite particles do not need to be treated with acid or washed with water. This tends to enable saving the manufacturing cost and providing a highly safe negative electrode material for a lithium ion secondary battery.

Further, as at least a part of the raw materials, spherical graphite particles that are already graphite may be used in addition to the graphitizable aggregate. By using spherical graphite particles that are already graphite, the manufacturing cost tends to be able to be saved by reducing the amount of the graphitization catalyst used for the graphitization of the raw materials, or shortening the calcination period for the graphitization. As a result, a less expensive negative electrode material for a lithium ion secondary battery can be provided while using an expensive artificial graphite. Further, the amount of the binder component used for manufacturing the negative electrode material for a lithium ion secondary battery can be reduced.

According to the foregoing method, the spherical graphite particles are calcined together with other raw materials. This allows lowering the R-value of the specific composite particles measured by Raman spectroscopy as compared to a case in which the spherical graphite particles are mixed with a calcined graphitized product of other raw materials.

In process (a), a mixture is obtained by mixing a graphitizable aggregate, a graphitizable binder, a graphitization catalyst, and spherical graphite particles.

Examples of the graphitizable aggregate include coke, such as fluid coke, needle coke, and mosaic coke. The graphitizable aggregate is not particularly limited as long as the aggregate is in a powder form. In particular, the graphitizable aggregate may be coke powder that easily graphitizes, such as needle coke. The graphite is not particularly limited as long as the graphite is in a powder form. The particle size of the graphitizable aggregate is preferably less than the particle size of the flat graphite particles.

Examples of the spherical graphite particles include spherical artificial graphite particles and spherical natural graphite particles. The details regarding the spherical graphite particles contained in the specific composite particles can be applied to the foregoing spherical graphite particles.

Examples of the graphitizable binder include a coal-based, petroleum-based, or artificial pitch or tar, a thermoplastic resin, and a thermosetting resin.

Examples of the graphitization catalyst include a substance having a graphitization catalytic function, such as silicon, iron, nickel, titanium, or boron, and a carbide thereof, an oxide thereof, and a nitride thereof.

The amount of the spherical graphite particles may be from 5 to 80% by mass, from 8 to 75% by mass, from 8 to 70% by mass, from 10 to 30% by mass, or from 11 to 19% by mass, with respect to 100 parts by mass of the graphitizable aggregate. When the amount of the spherical graphite particles is in the foregoing ranges, high density and high charge-discharge capacity tend to be obtained. Further, when the amount of the spherical graphite particles is in the foregoing ranges, favorable pore volume and favorable specific composite particles having the at least two peaks tend to be obtained.

The amount of the graphitizable binder may be from 5 to 80% by mass, from 10 to 80% by mass, or from 15 to 80% by mass, with respect to 100 parts by mass of the graphitizable aggregate. By adjusting the addition amount of the graphitizable binder to an appropriate amount, excess increase in the aspect ratio and specific surface area of the flat graphite particles to be produced can be suppressed. Furthermore, by controlling the amount of the graphitizable binder such that the content of the carbon residue that results from the binder after calcination is 30% by mass or less with respect to the total amount of the specific composite particles, excess increase in the R-value measured by Raman spectrometry can be suppressed.

The amount of the graphitization catalyst is not particularly limited. For example, the graphitization catalyst is preferably added in an amount of from 1 to 50 parts by mass with respect to 100 parts by mass of the total amount of the graphitizable aggregate and the graphitizable binder. When the amount of the graphitization catalyst is 1 part by mass or more, growth of the crystal of the graphitic particles tends to be favorable, and favorable charge-discharge capacity tends to be achieved. On the other hand, when the amount of the graphitization catalyst is 50 parts by mass or less, the graphitizable aggregate, the graphitizable binder, the graphitization catalyst, and the spherical graphite particles can be more uniformly mixed, thereby improving ease of operation.

Further, the amount of the graphitization catalyst is more preferably 30 parts by mass or less, further preferably 25 parts by mass or less, and particularly preferably 20 parts by mass or less, with respect to 100 parts by mass of the total amount of the graphitizable aggregate and the graphitizable binder. When the amount of the graphitization catalyst is within the foregoing ranges, composite particles having a suitable hardness tend to be obtained, since the graphitization does not proceed excessively. This enables favorably obtaining the pore volume and the at least two peaks of the specific composite particles.

Further, the amount of the graphitization catalyst is more preferably 5 parts by mass or more, further preferably 10 parts by mass or more, and particularly preferably 15 parts by mass or more, with respect to 100 parts by mass of the total amount of the graphitizable aggregate and the graphitizable binder. When the amount of the graphitization catalyst is within the foregoing ranges, the pore volume and the at least two peaks of the specific composite particles tend to be favorably obtained. Further, the development in crystallinity occurs favorably, and favorable charge-discharge capacity tends to be obtained.

In a preferable embodiment, the amount of the graphitization catalyst may be from 13 to 25% by mass, or from 15 to 20% by mass, with respect to 100 parts by mass of the total amount of the graphitizable aggregate and the graphitizable binder.

The method for mixing the graphitization catalyst is not particularly limited, and any mixing method can be employed that enables the graphitization catalyst to be present inside or on the surface of the particles in the mixture at least before the calcination for graphitization.

The method for mixing the graphitizable aggregate, the graphitizable binder, the graphitization catalyst, and the spherical graphite particles is not particularly limited. For example, the mixing may be performed using a kneader or the like. The mixing may be performed at a temperature equal to or higher than the softening temperature of the binder. Specifically, in a case in which the graphitizable binder is pitch or tar, the temperature may be from 50 to 300° C., and in a case in which the binder is a thermosetting resin, the temperature may be from 20 to 100° C.

In process (b), the mixture obtained in process (a) is calcined. By this, graphitizable components in the mixture are graphitized. The calcination is preferably carried out in an atmosphere in which the mixture is hardly oxidized. Examples of the calcination method include calcination in a nitrogen atmosphere, calcination in an argon gas atmosphere, or calcination under vacuum. The calcination temperature is not particularly limited as long as the graphitizable components can be graphitized. For example, the calcination temperature may be 1500° C. or higher, 2000° C. or higher, 2500° C. or higher, or 2800° C. or higher. The calcination temperature may be 3200° C. or lower. When the calcination temperature is 1500° C. or higher, a crystalline change occurs. When the calcination temperature is 2000° C. or higher, graphite crystals tend to grow in a favorable manner, whereby the amount of the residual graphitization catalyst remained in the produced graphite particles tends to be reduced, in other word, increase in the ash content tends to be suppressed. In either case, charge-discharge capacity and cycling performance of the battery tend to be improved. On the other hand, when the calcination temperature is 3200° C. or less, sublimation of part of the graphite can be suppressed.

In the method of manufacturing a negative electrode material for a lithium ion secondary battery, the method of preparing the composite particles may further include, between processes (a) and (b), at least one selected from the group consisting of molding the mixture (referred to as process (c)) and heat-treating the mixture (referred to as process (d)). Specifically, process (b) only may be performed after process (a), process (c) only may be performed after process (a), processes (b) and (c) may be performed in this order after process (a), or processes (c) and (b) may be performed in this order after process (a).

The molding in process (c) of molding the mixture can be carried out, for example, by pulverizing the mixture and placing it in a container such as a mold.

In process (d) of heat-treating the mixture, the heat treatment of the mixture is preferable from the viewpoint of advancing graphitization. In the case in which the heat treatment is performed, it is more preferable that the heat treatment is carried out after molding the mixture in the step (c). The heat treatment may be carried out at 1500° C. or higher, or 2500° C. or higher.

In a case in which the particle size has not been adjusted after the molding and pulverization of the mixture and before the calcination, the graphitized product obtained after the calcination may be subjected to pulverization to obtain a desired average particle size. Alternatively, the mixture may be molded and pulverized before the calcination to adjust the particle size, and the graphitized product obtained after the calcination may be further pulverized. The method for pulverizing the graphitized product is not particularly limited. For example, the pulverization may be carried out by a known method using a jet mill, a vibration mill, a pin mill, a hammer mill or the like. The average particle size (median diameter) after the pulverization may be 100 μm or less, or may be from 10 to 50 μm.

The graphitized product after the calcination and pulverization may be subjected to an isotropic pressing treatment. Examples of the method of the isotropic pressing treatment include a method in which the graphitized product obtained by the calcination and pulverization is placed in a container made of rubber or the like, which is sealed and subjected to an isotropic pressing treatment using a pressing machine. The graphitized product that has been subjected to the isotropic pressing treatment is preferably milled by a cutter mill or the like and graded with a sieve or the like.

In an embodiment for obtaining the specific composite particles in which the pore volume in a range of a pore diameter of from 0.10 to 8.00 μm obtained by the mercury intrusion method is from 0.20 to 1.00 mL/g and, in a log differential pore volume distribution obtained by the mercury intrusion method, at least two peaks appear in a range of a pore diameter of from 0.10 to 8.00 μm, the at least two peaks including a first peak P1 and a second peak P2 at a higher diameter than the first peak P1, the isotropic pressing treatment does not need to be carried out on the graphitized product obtained after the calcination and pulverization.

The method described above is one example of the method of manufacturing the specific composite particles. The specific composite particles may also be manufactured by any method other than the above-described method. Examples of such a method other than the above-described method include a method in which graphite particles are prepared by gathering or binding flat graphite particles together such that the flat graphite particles have non-parallel orientation planes (i.e., aggregate graphite particles), and thereafter, mixing spherical graphite particles therewith to form composite particles. For the method of forming the aggregate graphite particles, descriptions of Japanese Patent No. 3285520 and Japanese Patent No. 3325021, for example, may be referred to.

[Negative Electrode Material Slurry for a Lithium Ion Secondary Battery]

A negative electrode material slurry for a lithium ion secondary battery in an embodiment of the present disclosure includes: the above-described negative electrode material for a lithium ion secondary battery, or a negative electrode material for a lithium ion secondary battery manufactured by the above-described method of manufacturing a negative electrode material for a lithium ion secondary battery; an organic binder; and a solvent.

The organic binder is not particularly limited. Examples of the organic binder include a polymer compound such as a styrene-butadiene rubber; a (meth)acrylic copolymer derived from an ethylenically unsaturated carboxylic acid ester (e.g., methyl(meth)acrylate, ethyl(meth)acrylate, butyl (meth)acrylate, or hydroxyethyl (meth)acrylate), (meth) acrylonitrile, or an ethylenically unsaturated carboxylic acid (e.g., acrylic acid, methacrylic acid, itaconic acid, fumaric acid, or maleic acid); polyvinylidene fluoride; polyethylene oxide; polyepichlorohydrin; polyphosphazene; polyacrylonitrile; polyimide; and polyamideimide.

The solvent is not particularly limited. Examples of the solvent include an organic solvent such as N-methylpyrrolidone, dimethylacetamide, dimethylformamide, and γ-butyrolactone.

The negative electrode material slurry for a lithium ion secondary battery may include a thickener for adjusting viscosity, as necessary. Examples of the thickener include carboxymethylcellulose, methylcellulose, hydroxymethylcellulose, ethylcellulose, polyvinyl alcohol, polyacrylic acid and a salt thereof, oxidized starch, phosphorylated starch, and casein.

An electroconductive auxiliary agent may be added to the negative electrode material slurry for a lithium ion secondary battery, as necessary. Examples of the electroconductive auxiliary agent include carbon black, graphite, acetylene black, an oxide having electrical conductivity, and a nitride having electrical conductivity.

[Negative Electrode for Lithium Ion Secondary Battery]

A negative electrode for a lithium ion secondary battery in an embodiment of the present disclosure includes: a current collector; and a negative electrode material layer including the above-described negative electrode material for a lithium ion secondary battery or a negative electrode material for a lithium ion secondary battery manufactured by the above-described method of manufacturing a negative electrode material for a lithium ion secondary battery, that is formed on the current collector.

The material and shape of the current collector are not particularly limited. For example, a material made of a metal or an alloy, such as aluminum, copper, nickel, titanium, or stainless steel, and formed into a belt-shaped foil, a belt-shaped perforated foil, or a mesh belt, may be used. In addition, a porous material such as a porous metal (foamed metal) or carbon paper may be used.

The method for forming a negative electrode material layer including the negative electrode material for a lithium ion secondary battery on a current collector is not particularly limited. Examples thereof include known methods such as a metal mask printing method, an electrostatic coating method, a dip coating method, a spray coating method, a roll coating method, a doctor blading method, a gravure coating method, and a screen printing method. In a case in which the negative electrode material layer is integrated with the current collector, the integration may be carried out by a known method such as rolling, pressing, or a combination thereof.

The negative electrode for a lithium ion secondary battery obtained by forming the negative electrode material layer on a current collector may be subjected to a heat treatment depending on the type of the organic binder used. The heat treatment results in removal of the solvent, leading to an increase in the strength by curing of the binder, whereby adhesion between particles as well as between particles and the current collector tends to be improved. The heat treatment may be carried out in an inert atmosphere, such as a helium, argon, or nitrogen atmosphere, or in a vacuum atmosphere, in order to prevent oxidation of the current collector during the treatment.

The negative electrode for a lithium ion secondary battery may be subjected to pressing (pressing treatment) before the heat treatment. By the pressing treatment, the density of the electrode can be controlled. The density of the electrode may be from 1.5 to 1.9 g/cm$^3$, or from 1.6 to 1.8 g/cm$^3$. As the electrode density is increased, the volume capacity tends to be increased, the adhesion of the negative electrode material layer to the current collector tends to be improved, and cycling performance tends to be improved.

[Lithium Ion Secondary Battery]

A lithium ion secondary battery in an embodiment of the present disclosure includes a positive electrode, an electrolyte, and the above-described negative electrode for a lithium ion secondary battery. For example, the lithium ion secondary battery may have a configuration in which the negative electrode and the positive electrode are arranged so as to face each other via a separator, and in which an electrolytic solution containing an electrolyte is injected therein.

The positive electrode may be obtained similarly to the negative electrode by forming a positive electrode material layer on the surface of a current collector. As a current collector, a material made of a metal or an alloy, such as aluminum, titanium, or stainless steel, and formed into a belt-shaped foil, a belt-shaped perforated foil, or a mesh belt, may be used.

The positive electrode material used for the positive electrode layer is not particularly limited. Examples thereof include a metallic compound, a metal oxide, a metal sulfide, or an electrical conductive polymer material, that allows doping or intercalation of lithium ions. Furthermore, one or a combination of two or more of lithium cobaltate ($LiCoO_2$), lithium nickelate ($LiNiO_2$), lithium manganate ($LiMnO_2$), a composite oxide thereof ($LiCo_xNi_yMn_zO_2$, x+y+z=1, 0<x, 0<y; $LiNi_{2-x}Mn_xO_4$, 0<x☐2), lithium manganese spinel ($LiMn_2O_4$), a lithium vanadium compound, $V_2O_5$, $V_6O_{13}$, $VO_2$, $MnO_2$, $TiO_2$, $MoV_2O_8$, $TiS_2$, $V_2S_5$, $VS_2$, $MoS_2$, $MoS_3$, $Cr_3O_8$, $Cr_2O_5$, olivine-type $LiMPO_4$ (M: Co, Ni, Mn, Fe), an electrical conductive polymer such as polyacetylene, polyaniline, polypyrrole, polythiophene, or polyacene, and porous carbon may be used. In particular, lithium nickelate ($LiNiO_2$) and a composite oxide thereof ($LiCo_xNi_yMn_zO_2$, x+y+z=1, 0<x, 0<y; $LiNi_{2-x}Mn_xO_4$, 0<x☐2) have high capacity, and therefore, these are suitable for the positive electrode material.

Examples of the separator include a nonwoven fabric, a cloth, a microporous film, and a combination thereof using, as a main component, a polyolefin, such as polyethylene or polypropylene. In a case in which the lithium ion secondary battery to be produced has a structure in which a positive electrode and a negative electrode do not contact each other directly, it is unnecessary to use a separator.

Examples of the electrolytic solution to be used include a so-called organic electrolytic solution, in which a lithium salt such as $LiClO_4$, $LiPF_6$, $LiAsF_6$, $LiBF_4$, or $LiSO_3CF_3$, is dissolved in a non-aqueous solvent composed of one of or a mixture of two or more of ethylene carbonate, propylene carbonate, butylene carbonate, vinylene carbonate, fluoroethylene carbonate, cyclopentanone, sulfolane, 3-methylsulfolane, 2,4-dimethylsulfolane, 3-methyl-1,3-oxazolidin-2-on, γ-butyrolactone, dimethyl carbonate, diethyl carbonate, ethyl methyl carbonate, methyl propyl carbonate, butyl methyl carbonate, ethyl propyl carbonate, butyl ethyl carbonate, dipropyl carbonate, 1,2-dimethoxyethane, tetrahydrofuran, 2-methyltetrahydrofuran, 1,3-dioxolane, methyl acetate, and ethyl acetate. In particular, an electrolytic solution containing fluoroethylene carbonate is favorable, since a stable SEI (solid electrolyte interface) tends to be formed on the surface of the negative electrode material, and cycling performance is significantly improved. Further, at least one selected from the group consisting of ethylene carbonate, ethyl methyl carbonate and vinylene carbonate may also be suitably used.

The structure of the lithium ion secondary battery according to the present disclosure is not particularly limited, and examples thereof include a paper battery, a button battery, a coin battery, a layered-built battery, a cylindrical battery, and a rectangular battery. Besides the lithium ion secondary battery, the negative electrode material for a lithium ion secondary battery may be applied generally to an electrochemical apparatus utilizing intercalation and deintercalation of lithium ions as a charge-discharge mechanism, for example, a hybrid capacitor.

EXAMPLES

Hereinafter, the present disclosure will be described in detail below by way of Examples. However, the invention is not limited to these Examples.

Example 1

[1] 70 parts by mass of coke powder having an average particle size of 20 μm and 30 parts by mass of tar pitch were mixed and stirred at 100° C. for 1 hour to obtain a mixture. Thereafter, the mixture was pulverized to a size of 25 μm. 69 parts by mass of the pulverized mixture powder, 13 parts by mass of silicon carbide, and 18 parts by mass of spherical natural graphite particles (circularity: 0.92) were mixed, and the obtained mixed powder was placed in a mold and molded into a cuboid. The obtained cuboid was heat-treated at 1000° C. in a nitrogen atmosphere, and then calcined at 2800° C. to graphitize the graphitizable components. The obtained graphite molded product was pulverized such that the average particle size was 20 to obtain graphite powder (specific composite particles).

The average particle size, R value, pore volume and log differential pore volume distribution (diameters at the first peak P1 and the second peak P2, and the intensity ratio thereof), specific surface area, saturated tap density, and pellet density of the graphite powder (specific composite particles) obtained above were evaluated. The measurements were carried out by the methods described above.

[2] 98 parts by mass of the graphite powder (specific composite particles) obtained above, 1 part by mass of styrene butadiene rubber (BM-400B, manufactured by Zeon Corporation), and 1 part by mass of carboxymethyl cellulose (CMC2200, manufactured by Daicel Corporation) were kneaded to prepare a slurry. The slurry was applied to a current collector (a copper foil having a thickness of 10 μm), dried in an atmospheric air at 110° C. for 1 hour, and integrated by a roll press under a condition by which the applied material (active material) had an electrode density of 1.70 g/cm$^3$, to fabricate a negative electrode for a lithium ion secondary battery.

The liquid permeation property of the negative electrode for a lithium ion secondary battery was measured as follows.

[Liquid Permeation Property]

The negative electrode for a lithium ion secondary battery fabricated as described above was punched to obtain a circular piece. 1 μm of PC (polycarbonate, manufactured by Kishida Chemical Co., Ltd) was dropped onto the center of the negative electrode for a lithium ion secondary battery, and the permeation period, which is a period until PC permeated, was measured.

[3] The negative electrode obtained as described above, a lithium metal as a positive electrode, a mixture of ethylene carbonate/ethyl methyl carbonate (volume ratio: 3/7) and vinylene carbonate (0.5% by mass) containing 1.0 M LiPF$_6$ as an electrolytic solution, a porous membrane made of polyethylene having a thickness of 25 μm as a separator, and a copper plate having a thickness of 230 μm as a spacer, were used to fabricate a type 2016 coin cell.

[4] The specific composite particles produced in the Example was mixed with non-composite spherical natural graphite particles (average particle size: 22 μm) at a ratio of 5:5 (specific composite particles:spherical natural graphite particles) to prepare a mixed negative electrode material. A log differential pore volume distribution was obtained for the mixed negative electrode material using the mercury intrusion method under the conditions described above.

Example 2

(1) 40 parts by mass of coke powder having an average particle size of 20 μm, 30 parts by mass of tar pitch, 13 parts by mass of silicon carbide, 14 parts by mass of spherical natural graphite particles, and 2 parts by mass of stearic acid were mixed and stirred at 100° C. for 1 hour to obtain a mixture. The obtained mixture powder was molded by extrusion molding. The obtained cylinder was heat-treated at 1000° C. in a nitrogen atmosphere and then calcined at 2800° C. to graphitize the graphitizable components. The obtained graphite molded product was pulverized such that the average particle size was 19 μm, to obtain graphite powder (specific composite particles) of Example 2.

A negative electrode for a lithium ion secondary battery and a lithium ion secondary battery were fabricated in the same manner as in Example 1, and were evaluated in the same manner as in Example 1.

Comparative Example 1

(1) 70 parts by mass of coke powder having an average particle size of 15 μm and 30 parts by mass of tar pitch were mixed and stirred at 100° C. for 1 hour to obtain a mixture. The mixture was then pulverized to a size of 25 μm. 62 parts by mass of the pulverized mixture powder, 18 parts by mass of silicon carbide, and 20 parts by mass of spherical natural graphite particles (circularity: 0.92) were mixed, and the obtained mixed powder was placed in a mold and molded into a cuboid. The obtained cuboid was heat-treated at 1000° C. in a nitrogen atmosphere and then calcined at 2800° C. to graphitize the graphitizable components. The obtained graphite molded product was pulverized such that the average particle size was 24 μm, to obtain graphite powder. A rubber container was filled with the obtained graphite powder, was sealed, and was subjected to an isotropic pressing treatment at a pressure of 9800 N/cm$^2$ (1000 kgf/cm$^2$) using a pressing machine. Thereafter, the graphite powder was milled with a cutter mill and was graded with a sieve to obtain graphite powder (specific composite particles) of Comparative Example 1.

A negative electrode for a lithium ion secondary battery and a lithium ion secondary battery were fabricated in the same manner as in Example 1, and were evaluated in the same manner as in Example 1.

Comparative Example 2

A rubber container was filled with the graphite powder (specific composite particles) obtained in Example 2, was sealed, and was subjected to an isotropic pressing treatment at a pressure of 9800 N/cm$^2$ (1000 kgf/cm$^2$) using a pressing machine. Thereafter, the graphite powder was milled with a cutter mill and was graded with a sieve to obtain graphite powder (specific composite particles) of Comparative Example 2.

A negative electrode for a lithium ion secondary battery and a lithium ion secondary battery were fabricated in the same manner as in Example 1, and were evaluated in the same manner as in Example 1.

Table 1 shows the evaluation results of the Examples and the Comparative Examples. Further, log differential pore volume distributions of the specific composite particles produced in the Examples and the Comparative Examples are shown in FIGS. 1A to 1D. Furthermore, log differential pore volume distributions of mixed negative electrode materials containing the spherical natural graphite particles and the specific composite particles of Examples 1 and 2 and Comparative Example 1, respectively, are shown in FIG. 2.

In Table 1, "-" indicates "not applicable". The P1 diameter and P2 diameter indicate a pore diameter corresponding to the maximum log differential pore volume of a first peak P1, and a pore diameter corresponding to the maximum log differential pore volume of a second peak P2, if present, in a range of a pore diameter of form 0.10 to 8.00 µm, respectively. In a case in which only one peak appeared within the foregoing range, the peak was classified as P1.

In the log differential pore volume distributions of FIGS. 1A to 1D and FIG. 2, the vertical axes represent the log differential pore volume ($cm^3/g$) and the horizontal axes represent the pore diameter (µm).

Figure 2:
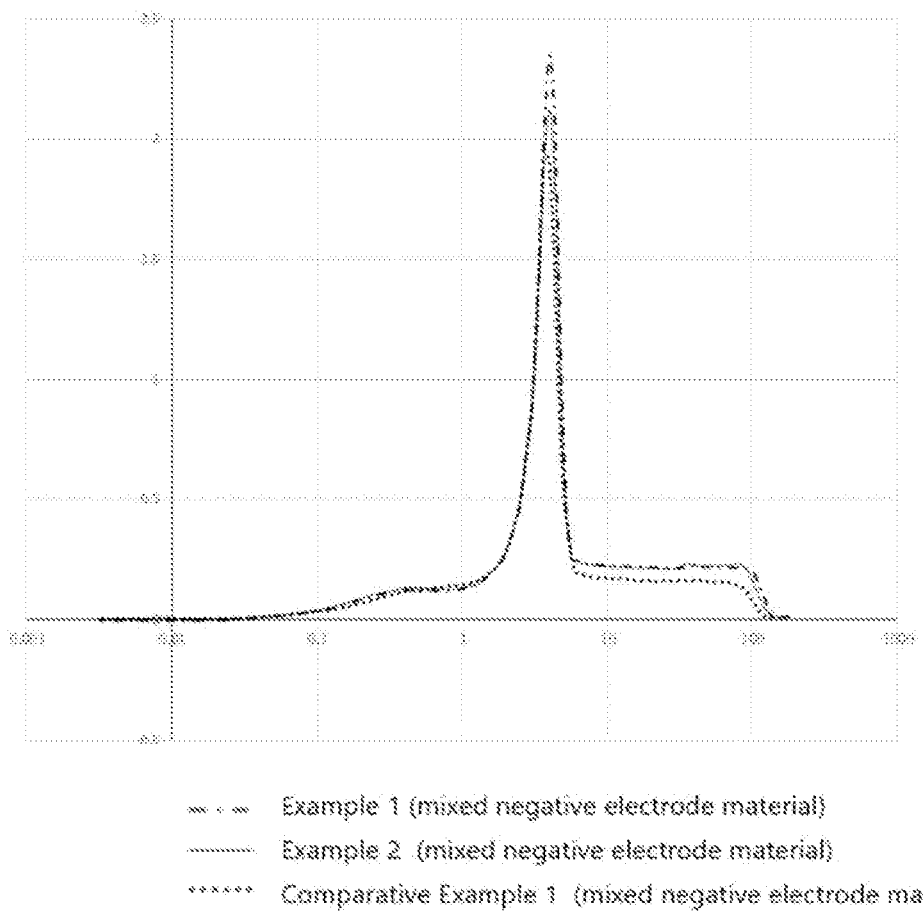
FIG. 2 shows log differential pore volume distributions of the mixed negative electrode materials of non-composite spherical natural graphite particles and the composite particles produced in Examples 1, 2, and Comparative Example 1, respectively, obtained by the mercury intrusion method.

As shown in FIG. 2, a single peak was observed in the log differential pore volume distribution of the mixed negative electrode material produced in each of Examples 1 and 2 and Comparative Example 1.

All documents, patent applications, and technical standards described in the present disclosure are herein incorporated by reference to the same extent as if each individual document, patent application, or technical standard was specifically and individually indicated to be incorporated by reference.

The invention claimed is:

1. A negative electrode material for a lithium ion secondary battery, the negative electrode material comprising composite particles, each of the composite particles comprising: a spherical graphite particle; and flat graphite particles that are gathered or bound together such that the flat graphite particles have non-parallel orientation planes, wherein the composite particles satisfy the following conditions (1) and (2):
  (1) a pore volume in a range of a pore diameter of from 0.10 to 8.00 µm obtained by a mercury intrusion method is from 0.20 to 1.00 mL/g; and
  (2) in a log differential pore volume distribution obtained by the mercury intrusion method, wherein a peak is defined as a point at which a slope the log differential pore volume distribution changes from a positive value to a negative value, at least two peaks appear in a range of a pore diameter of from 0.10 to 8.00 µm, the at least two peaks including a first peak P1 and a second peak P2 at a higher diameter than the first peak P1, wherein:
  a pore diameter corresponding to a maximum log differential pore volume of the first peak P1 is from 0.10 to less than 4.00 µm, and
  a pore diameter corresponding to a maximum log differential pore volume of the second peak P2 is from 4.50 to 7.00 µm.

2. The negative electrode material for a lithium ion secondary battery according to claim 1, wherein a ratio of peak intensities of the first peak and the second peak (P1/P2) is less than 4.0.

3. The negative electrode material for a lithium ion secondary battery according to claim 1, wherein an R-value of the composite particles as measured by Raman spectroscopy is from 0.03 to 0.10.

4. The negative electrode material for a lithium ion secondary battery according to claim 1, wherein the composite particles have a specific surface area as measured by the BET method from 1.5 to 6.0 $m^2/g$.

5. The negative electrode material for a lithium ion secondary battery according to claim 1, wherein a saturated tap density of the composite particles is from 0.60 to 0.90 $g/cm^3$.

TABLE 1

| Item | Average particle size | R-value | Pore volume | P1 diameter | P2 diameter | P1/P2 intensity ratio | Specific surface area | Saturated tap density | Pellet density | Liquid permeation property |
|---|---|---|---|---|---|---|---|---|---|---|
| Unit | µm | — | mL/g | µm | µm | — | $m^2/g$ | $g/cm^3$ | $g/cm^3$ | s |
| Example 1 | 20.1 | 0.09 | 0.78 | 3.00 | 5.63 | 3.8 | 4.3 | 0.68 | 1.77 | 250 |
| Example 2 | 18.5 | 0.08 | 0.75 | 2.76 | 4.75 | 4.0 | 3.8 | 0.69 | 1.77 | 215 |
| Comparative Example 1 | 23.6 | 0.09 | 0.60 | 3.35 | — | — | 4.1 | 0.92 | 1.81 | 327 |
| Comparative Example 2 | 20.1 | 0.08 | 0.61 | 4.10 | — | — | 4.3 | 0.80 | 1.78 | 352 |

By observation with a scanning electron microscope (SEM), it was confirmed that the graphite powders obtained in the Examples and the Comparative Examples were composite particles containing spherical graphite particles and flat graphite particles that are gathered or bound together such that the flat graphite particles have non-parallel orientation planes.

Further, as shown in FIGS. 1A to 1D, the log differential pore volume distributions of the specific composite particles produced in Examples 1 and 2 had two peaks within the range of a pore diameter of from 0.10 to 8.00 µm. On the other hand, a single peak was observed within the foregoing range in the case of the composite particles produced in Comparative Examples 1 and 2.

As demonstrated in Table 1, improved liquid permeation properties were observed in the negative electrodes for a lithium ion secondary battery fabricated in the Examples.

Further, upon measuring the charge capacity, discharge capacity, efficiency, and rapid discharge retention rate of the lithium ion secondary batteries fabricated in the Examples and the Comparative Examples, good battery performance was confirmed in all of the above.

6. The negative electrode material for a lithium ion secondary battery according to claim 1, wherein the spherical graphite particles have a circularity of 0.80 or higher.

7. The negative electrode material for a lithium ion secondary battery according to claim 1, further comprising spherical natural graphite particles that are not a portion of the composite particles, wherein a content of the spherical natural graphite particles that are not a portion of the composite particles with respect to a total amount of the composite particles and the spherical natural graphite particles that are not a portion of the composite particles is 30% by mass or more.

8. A method of manufacturing the negative electrode material for a lithium ion secondary battery according claim 1, the method comprising preparing the composite particles by a method comprising:
    obtaining a mixture comprising a graphitizable aggregate, a graphitizable binder, a graphitization catalyst, and a spherical graphite particle; and
    calcining the mixture.

9. The method of manufacturing the negative electrode material for a lithium ion secondary battery according to claim 8, wherein the method of preparing the composite particles further comprises, between obtaining the mixture and calcining the mixture, at least one selected from the group consisting of molding the mixture and heat-treating the mixture.

10. A negative electrode material slurry for a lithium ion secondary battery, the slurry comprising:
    the negative electrode material for a lithium ion secondary battery according to claim 1;
    an organic binder; and
    a solvent.

11. A negative electrode for a lithium ion secondary battery, the negative electrode comprising:
    a current collector; and
    a negative electrode material layer comprising the negative electrode material for a lithium ion secondary battery according to claim 1, that is formed on the current collector.

12. A lithium ion secondary battery, comprising:
    a positive electrode;
    an electrolyte; and
    the negative electrode for a lithium ion secondary battery according to claim 11.

* * * * *